Jan. 16, 1951 W. L. MORRISON, JR 2,538,583
PRESSURE COOKER
Filed June 25, 1947 2 Sheets-Sheet 1

INVENTOR.
WILLARD L. MORRISON JR
BY John W. Michael
ATTORNEY

Jan. 16, 1951 W. L. MORRISON, JR 2,538,583
PRESSURE COOKER
Filed June 25, 1947 2 Sheets-Sheet 2
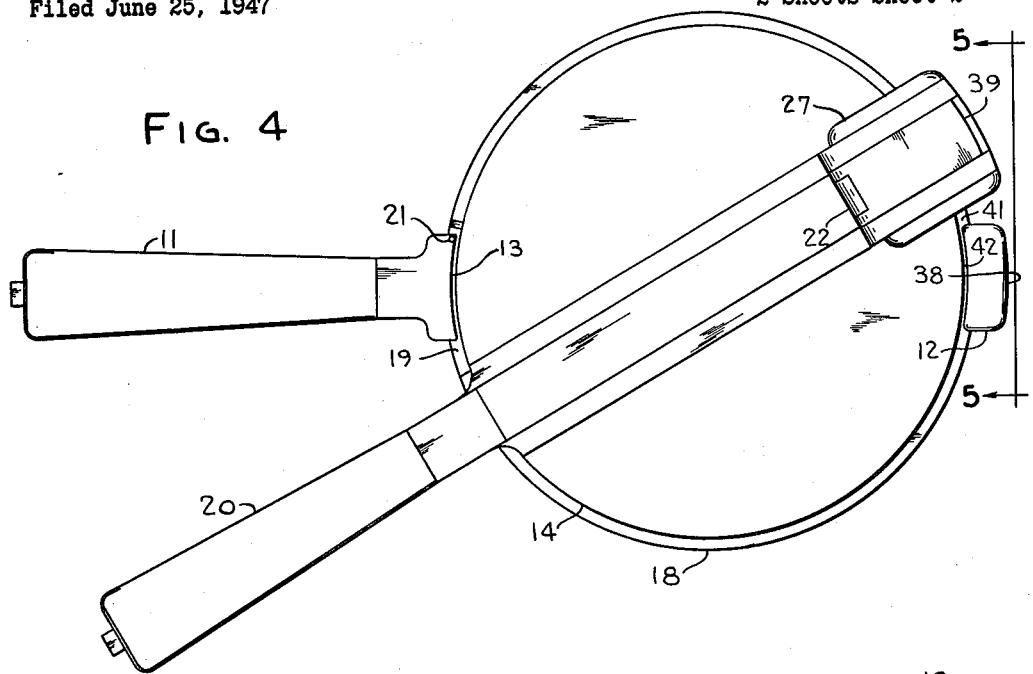
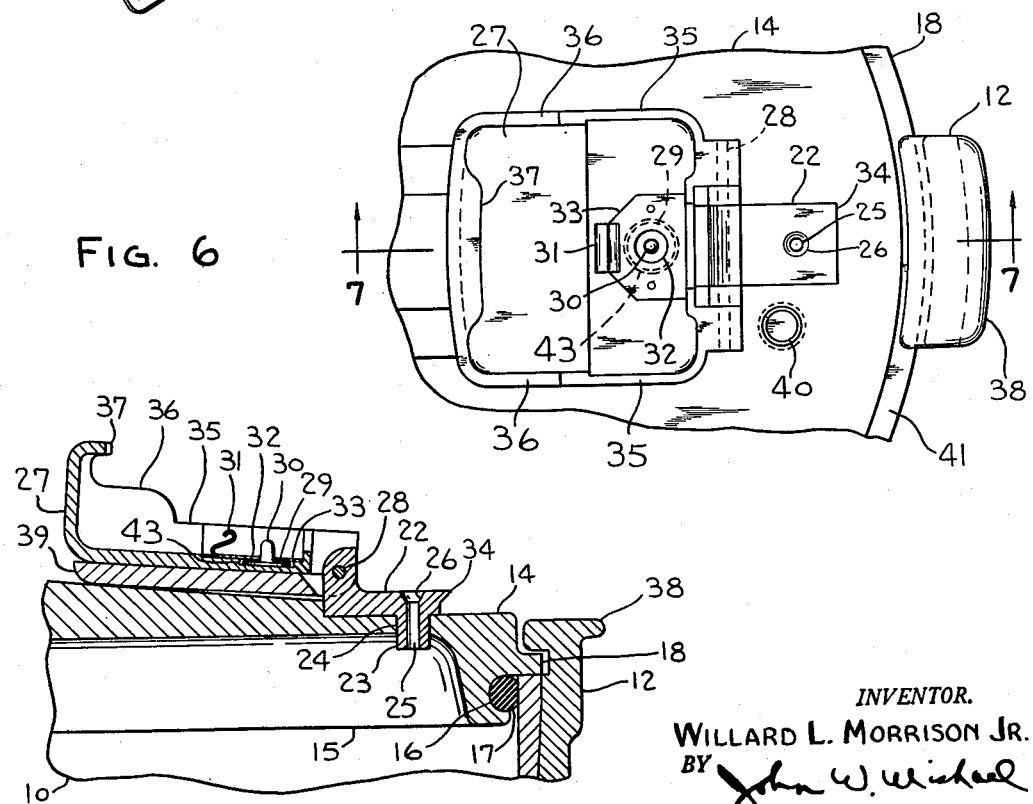
INVENTOR.
WILLARD L. MORRISON JR.
BY John W. Michael
ATTORNEY

Patented Jan. 16, 1951 2,538,583

UNITED STATES PATENT OFFICE 2,538,583

PRESSURE COOKER

Willard L. Morrison, Jr., West Bend, Wis., assignor to West Bend Aluminum Co., West Bend, Wis., a corporation of Wisconsin Application June 25, 1947, Serial No. 756,911

11 Claims. (Cl. 126—388)

This invention relates to improvements in pressure cookers and pressure regulators therefor.

In the application of Leonard A. Finch, Ser. No. 676,671, filed June 14, 1946, now matured into Patent No. 2,534,164, dated December 12, 1950, and assigned to West Bend Aluminum Co., the assignee of this application, there is described and claimed a pressure regulator which cannot be closed to regulating position, unless the cover has been completely locked, and which will be moved to vent position as the unlocking movement of the cover is started. However, it is often desirable to move the regulator to vent position while the pressure is up. In such position the regulator may and in many cases does swing to vent hole accessible position permitting the steam to escape in the form of a dangerous and undesirable geyser. It is also possible, by exerting abnormal force, to rapidly complete the unlocking movement of the cover before the pressure has entirely dropped. If this is done the cover will jump up and the steam can escape in such fashion as to injure the hands of the person holding the cooker.

Many pressure cookers have visual or dial type gauges to indicate that the pressure (and hence temperature) within the cooker is at the desired point. Other pressure cookers rely on occasional erratic audible sizzling of steam to indicate that the pressure is at the desired point. These methods are unsatisfactory. The regulation of the applied heat by watching a visible pressure gauge requires constant attention and adjustment. Adjustment of the applied heat by waiting for an occasional audible signal is practically impossible. If the applied heat is lowered too much, there will never be another signal and the user will allow the pressure to drop far below the desired point before becoming aware of such drop.

It is the present practice to provide standard safety plugs which blow at pressures below the breaking pressure of the vessel. When these plugs let go, steam and other contents of the cooker are projected upwards in a geyser injurious to the ceiling and adjacent walls and also dangerous to persons in the immediate vicinity.

One of the objects of the invention, therefore, is to provide a pressure regulator for a pressure cooker which may be set at venting position and in such position prevent the escape of steam in the form of an uncontrolled undesirable geyser.

Another object of the invention is to provide a pressure regulator for a pressure cooker which produces a constantly audible signal whenever the pressure is at or above the desired point, which signal has a pitch variable with changes in pressure which the user can utilize to determine the adjustment of the heat applied to the cooker.

A still further object of this invention is to provide a pressure cooker having a standard safety blow-out plug which in the emergency operation thereof will not form a dangerous undesirable ceilingward projected geyser.

The first of these objects is obtained by providing a pressure regulator which has a vent accessible position, a venting position, and a pressure-regulating position. In the venting position, however, the regulator body overlies the vent hole and is locked against moving away, from such overlying position. Thus the steam projects against the regulator body and is diffused and its temperature consequently lowered to a point where it is comparatively safe to hold the hand near the pressure regulator without the danger of burns.

In order to obtain an audible cooking signal, which constantly indicates that pressure within the cooker is at or in excess of the desired amount, the valve which closes the chamfered seat on the vent is provided with a substantially spherical seating portion and is fully floatably mounted on the pressure regulator body as close to the pivotal point of such regulator body as is practical. With this construction, as pressure increases within the cooker to a point where it forces the valve upwardly, it causes the pressure regulator body to swing upwardly about its pivotal connection. The momentum thus imparted carries the regulator body farther than is necessary. Gravity then causes the regulator body to swing downwardly. Thus there is set up a vibratory motion. If the pressure is increasing, the frequency of the vibrations of the regulator body increases. If the pressure is decreasing, such frequency decreases. These vibrations of the regulator body and the valve causes the escaping steam to produce an audible signal. This signal has an recognizable pitch which remains constant and even and makes an even fluttering sound at the desired operating pressure. Once the pressure reaches the desired amount for which the regulator is set, the signal is continuous, but as the pressure exceeds the desired pressure its pitch varies with the changes in the pressure above such amount. As the heat becomes excessive there is a violent fluttering and increased volume of sound. It is therefore an easy task for the user to make proper adjustments of the applied heat to keep the pressure at a predetermined desirable point. When such is attained, less fuel is used, less moisture lost, and the cooking proceeds at an advantageous even rate.

As previously described, the pressure regulator has a venting position in which it is locked. By providing the body of the pressure regulator with a depending skirt, and placing the emergency safety plug beneath the regulator body and within the confines of the skirt, the steam and contents of the container, which project under tremendous force when the plug blows, hit the under surface of the regulator body, are deflected and diffused, and escape around such skirt. This causes the steam to be cooled and its temperature will drop to a point where it is comparatively safe. In addition, it prevents any contents of the cooker from being projected to the ceiling and adjacent walls with consequent injury thereto.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 4 is a top plan view of the pressure cooker embodying the present invention with the cover shown on the vessel but in unlocked position;

Fig. 6 is an enlarged fragmentary top plan view of the vent hole and safety plug with the pressure regulator body swung to vent accessible position; and Fig. 7 is a sectional view taken on the line 7—7 of Fig. 6.

Figure 1:
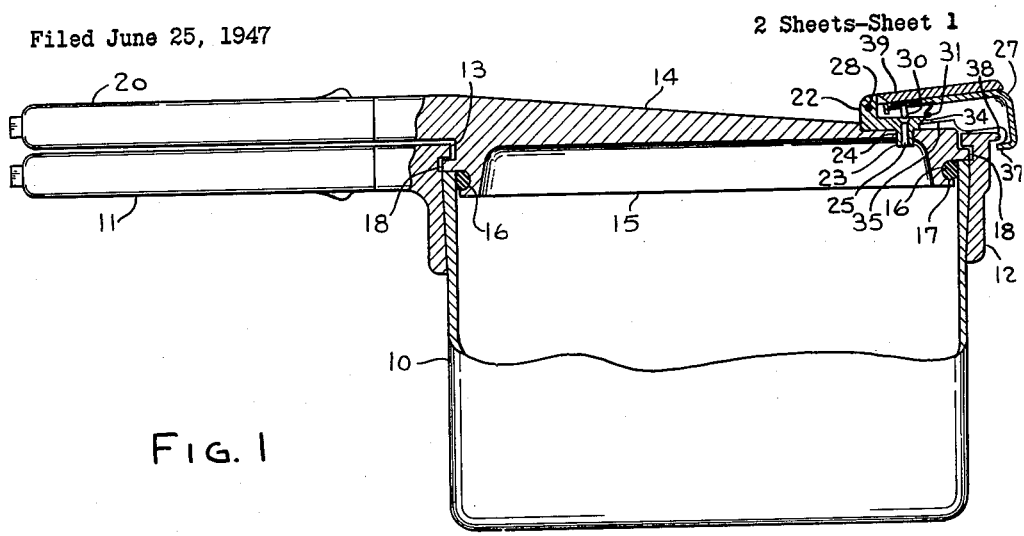
Fig. 1 is a view, partly in side elevation and partly in section, of a pressure cooker and regulator embodying the present invention showing the pressure regulator body in the locked venting position.

Referring to the drawings by reference numerals, the pressure cooker comprises a container 10 which is provided with the customary handle 11 by which the container may be manipulated. The container 10 is provided at oppositely spaced portions with cover holding or retaining lugs 12 and 13. The lug 13 is preferably (but not necessarily) formed at the juncture of the handle 11 with the wall of the container 10. Such position causes the pouring sides of the container to be free from any projections which would interfere with the normal emptying of the contents of the container. The purpose of these lugs 12 and 13 is to limit and restrain the upward movement of the cover member 14 under the influence of pressure above atmosphere generated within the container, and their size is designed to provide adequate holding strength. The cover 14 is disk-like in shape and has a depending annular flange or skirt 15 which extends down within the container when the cover is positioned thereon. The external diameter of this flange is slightly less than the diameter of the interior of the vessel so as to have an easy fit therein. The outer wall of the flange 15 is provided with an encircling groove 16 into which is inserted a sealing ring 17 formed of rubber or other compressible and resilient materials. Its thickness is such that it extends slightly beyond the outer cylindrical surface of the flange 15 and provides a surface-to-surface contact with the interior of the vessel 10 when the cover is in position. With seals of this character it is not essential to press or clamp down the cover against the container to form the seal. As pressure greater than the atmosphere is generated within the container, the cover will rise until it abuts the lips of the lugs 12 and 13, and the seal between the sealing ring 17 and the vessel 10 will be increased by the action of the internal pressure. In order to prevent the cover from rising beyond the limits of the holding lugs 12 and 13, it is provided with a laterally extending rim 18. This rim 18 is provided with an opening 19 adjacent the handle 20. As shown in Fig. 4, the opening 19 is spaced angularly clockwise from the juncture between the handle 20 and the cover 14. The opening 19 is, of course, long enough to permit the lug 13 to pass therethrough. With this construction, to position the cover 14 on the container the handles 11 and 12 are relatively positioned as shown in Fig. 4, whereupon the rim 18 may be inserted under the lug 12 and the flange 15 positioned within the container 10. The handle side of the cover 14 may then be lowered so that the lug 13 passes through the opening 19 permitting the rim 18 to rest flush against the upper edge of the container 10. To lock the cover 14, the handle 20 is moved in a clockwise rotation relative to the container 10 until the handles are in substantial alinement. This causes the rim 18 to pass under the lug 13. A small pin 21 or other like abutment positioned on the upper edge of the container 10 adjacent the juncture of the handle 11 with said container will engage the edge of the rim 18 at the opening 19 to arrest the clockwise motion of the cover when the handles are in substantial alinement. When the cover has been fully rotated from the unlocked position shown in Fig. 4 to the fully locked position shown in Fig. 1, the full areas of the lugs 12 and 13 will have a surface-to-surface abutment with the rim 18 of the container when it is moved upwardly by internal pressure and jointly act to keep the cover 14 from rising farther.

Figure 5:
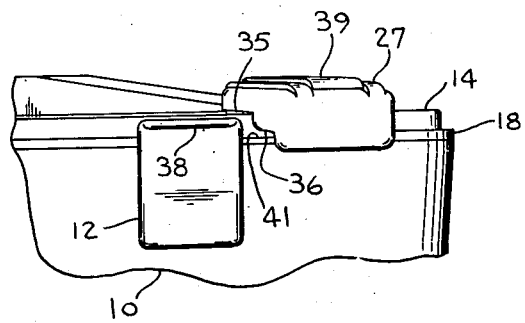
Fig. 5 is a fragmentary side elevational view taken from the line 5—5 of Fig. 4.

In the application above identified, the valve-carrying member or pressure regulator body, in the closed and fully locked position of the cover, may be swung completely free of the vent hole. A feature of this invention is that the pressure regulator body is locked in venting position. The pressure regulator unit, as is most clearly shown in Figs. 6 and 7, comprises a bracket 22 which is secured to the cover 14 adjacent its periphery and substantially opposite the handle 20. The bracket 22 is provided with a projection 23 which extends downwardly through an opening 24 in the top 14. This projection is used to rigidly secure the bracket 22 in place and also contains the vent hole 25. The upper end of the vent 25 is chamfered as indicated at 26 to provide a valve seat. The valve-carrying member or pressure regulator body 27 is hinged to the bracket 22 by a pin 28. It may be swung from a position overlying the vent 25 (either regulating or venting position) to the vent accessible position shown in Figs. 6 and 7. The regulator body 27 is provided with a circular recess 43 which loosely receives the retaining flange 29 of the valve 30. The flange 29 is held within the recess 43 by the holding plate 33 of a positioning spring 31. The valve 30 fits loosely in and projects through an aperture 32 in such plate 33. The plate 33 is held in place by pins or other well-known fastening devices. In this manner the valve 30 is fully floatably mounted with respect to the regulator body 27. It can therefore accurately adjust and center itself with respect to the seat 26 when such body is swung to the regulating position shown in Fig. 2. The bracket 22 is provided with a lip 34 upon which the spring 31 rests to resiliently hold the regulator body 27 in the venting position shown in Fig. 1. In this position steam can freely escape from the vent 25. The regulator body 27 has a depending encircling skirt 35. However, at each side of the regulator body 27, adjacent its free edge, the skirt 35 has similarly shaped enlarged portions 36. That portion which is viewed in Fig. 5 constitutes a cam. The purpose of this cam is to cause the regulator body 27 to be moved to the venting position shown in Fig. 1 whenever the cover, while in closed position, is moved from unlocked position toward locked position or from locked position toward unlocked position. The opposite portion 36 performs no camming function. It is used for appearances. Along the free or front edge of the regulator body 27, the skirt 35 is made deeper and has an inwardly projecting locking flange 37. The lug 12 has an outwardly extending lip 38 at its upper end. The flange 37 and the lip 38 are in overlapping relationship whenever the cover 14 is on the container and in locked or partly locked position. However, the lip 37 is placed sufficiently below the plane of the regulator body 27 to permit such body to be in the venting position shown in Fig. 1. However, the flange 37 will engage the under portion of the lip 38 to prevent the regulator body 27 from being swung to a more fully open position than the venting position.

Whenever the cover 14 is positioned on the container 10, it may be swung from a fully unlocked position, shown in Fig. 4, to a fully locked position, shown in Fig. 1. If the regulator body 27 is in the venting position shown in Fig. 1 it will remain in such position when the cover is so swung. If the regulator body 27 is in the pressure-regulating position shown in Fig. 5, it will be forcibly raised by the action of the cam 36 riding up on to the upper surface of the lug 12 so that the spring 31 snaps up over the lip 34 and thereafter maintains the regulator body 27 in the venting position. If the body 27 happens to be in the vent accessible position shown in Figs. 6 and 7, it will remain in that position when the cover is so swung. However, if the cover is swung to locked or partly locked position while the regulator body 27 is in the vent accessible position, then such body cannot be swung to either venting or regulating position. When the regulator body 27 is in the regulating position of Fig. 2, and the cover is moved from the fully locked position toward unlocked position, the action of the cam 36 will again cause the body 27 to assume the venting position.

Figure 2:
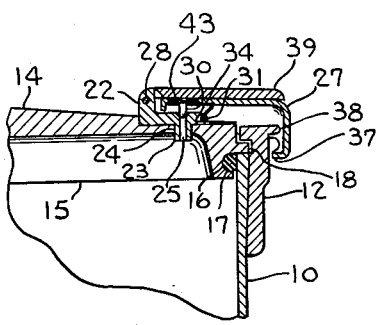
Fig. 2 is a fragmentary cross sectional view with the pressure regulator body in pressure-regulating position.

The following description pertaining to the pressure regulator body 27 is applied to such body when it is in the regulating position shown in Fig. 2. The weight of the regulator body 27 and the distance of its center of gravity from the pivot 28, comprising one moment of force, is proportioned to the distance of the valve 30 from the pivot 28 and the steam contacting area of the valve 30, comprising another moment of force, to permit the latter moment of force to overcome the former moment of force when the internal pressure has reached a predetermined pressure, for example, of substantially ten pounds per square inch. This permits steam to escape from the vent 25 to keep the internal pressure at that amount. The valve 30 has a substantially spherical seat-closing surface which automatically fits within the seat 26. When the pressure reaches the predetermined amount it will cause the valve 30 to lift. This in turn causes the regulator body 27 to swing up a small amount about the pivot 28. The extreme upper limit of such upward swing is determined by the spring 31 contacting the underside of the lip 30 and is sufficiently high so as not to interfere with the regular and continuous reciprocation of such body as hereafter described. Due to this motion there is set up a momentum which carries the body 27 and valve 30 farther than would be necessary to permit the escape of the proper amount of steam. As a result, the body and valve by the force of gravity swing down in the opposite direction with enough force to momentarily close down the size of the valve opening more than that required for the proper release of steam. This in turn causes the pressure to build up again and reverse the swinging motion of the valve and body. As a result, a regular and continuous reciprocal swinging motion of the regulator body 27 and valve 30 constantly takes place during all the time that the pressure within the container is at or above the predetermined limit. When it is required to regulate the internal pressure at a greater predetermined amount, an auxiliary weight 39, also pivotally mounted on the pin 28, is swung so that it rests upon the body 27.

Figure 3:
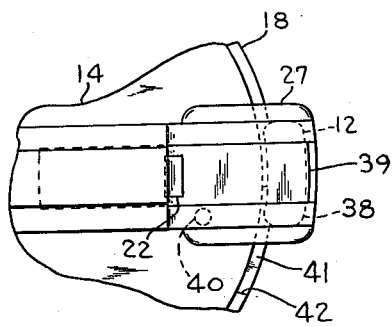
Fig. 3 is a fragmentary top plan view of the pressure regulator body as viewed in Figs. 1 and 2.

As an additional safety measure, it is desirable to have a standard type of safety blow-out plug, such as that designated at 40, see Figs. 3 and 6. In this embodiment of the invention, the plug 40 is inserted in a hole in the cover which is positioned adjacent the pin 28 and within the confines of the skirt 35 when the regulator body 27 is in the venting or regulating position. The reason for this is that if the plug does blow, the steam and contents of the cooker are ejected upwardly against the under surface of the regulator body 27. Such under surface and the surrounding skirt 35 deflect and diffuse the steam, bending it at ninety degree angles so that it escapes in all directions outwardly from under the skirt 35. This cools the steam to a degree which makes it substantially harmless. It also prevents an injurious geyser of steam and container contents from being shot upwardly on to the ceiling and adjacent walls.

As previously described, the pressure regulator body 27 is moved to venting position by rotation of the cover 14 to lock or unlock it. This is a safety factor which is designed to prevent the building up of pressure within the cooker when it is only partially locked or to permit the escape of pressure during unlocking action. However, it is also desirable and advantageous to be able to vent the container when the cover is fully locked. To do this it is only necessary for the user to manually swing up the regulator body 27 from the regulating position of Fig. 2 to the venting position of Fig. 1, snapping the spring 31 over the lip 34. The engagement of the flange 37 with the lip 38, however, prevents the regulator body 27 from swinging farther upwardly. Hence, it will remain in the overlying position in spite of any lifting force exerted by the geyser of steam which strikes strongly against the under side thereof. The geyser of the steam strikes against the under side of the body, is bent at substantially ninety degrees angle, and dispersed so that it escapes around the entire periphery of the skirt 35. This cools the steam enough to render it harmless. The elimination of the customary geyser of steam also does away with the possibility of alarming or injuring the user.

Although only one embodiment of the invention is shown and described herein, it will be understood that this application is intended to cover such changes or modifications as come within the spirit of the invention or scope of the following claims.

I claim:
1. A pressure cooker comprising a container, a cover for said container, locking means operable when said cover is positioned on said container and rotated relative thereto to lock said cover to said container, a vent for said container, a regulator body movably mounted on said pressure cooker for movement between a regulating position overlying said vent and a vent accessible position, a valve carried by said body and cooperable with said vent when said regulator body is in said overlying position, a lip on said pressure cooker, and a flange on said body movable into abuttable relationship with said lip when said cover is rotated toward locked position, said lip and flange being abuttable to maintain said regulator body in said overlying position.

2. A pressure cooker as claimed in claim 1 in which the regulator body has a lower surface surrounded by a depending peripheral flange to form steam deflecting and dispersing means.

3. A pressure cooker as claimed in claim 1 in which the regulator body also has a venting position while overlying said vent and in which there is a spring for releasably maintaining said regulator body in said venting position.

4. A pressure cooker as claimed in claim 1 in which said regulator body is provided with a camming surface adapted to ride on a cooperable camming surface on said cooker while said cover is rotated to lock or unlock said cover, said camming action causing said regulator body to be moved to a venting position while still in position overlying said vent.

5. A pressure cooker as claimed in claim 1 in which there is provided a safety blow out plug, the opening of which lies beneath said regulator body when said body is in regulating position overlying said vent.

6. A pressure cooker comprising a container, a cover for said container, means for locking said cover to said container which requires relative rotation between said cover and said container from an unlocked position to a locked position while said cover is in position on said container, a vent for said container, a regulator body movably mounted on said pressure cooker, a valve carried by said regulator body, said regulator body being swingable from a vent accessible position entirely to one side of the longitudinal axis of said vent to a position overlying said vent, and inter-engageable portions on said regulator and said container operable in said locked position to retain said regulator body in said vent overlying position.

7. A pressure cooker as claimed in claim 6 in which the regulator body is pivotally mounted on said pressure cooker, the valve is loosely and floatably carried by said regulator body adjacent said pivotal connection and has a spherical seat closing surface, and the vent is provided with a conical seat cooperable with said spherical surface whereby said regulator body and valve are given a continuous reciprocal swinging motion during the time that steam is escaping from said vent to produce a constant audible fluttering sound.

8. A pressure cooker comprising a container, a lockable cover for said container, a pressure regulator for said container including a vent and a regulator body, said regulator body swingably overlying said vent, a safety plug for said container having its opening beneath said regulator body, a lower surface surrounded by a depending peripheral flange to form deflecting and dispersing means for steam and other contents of said pressure cooker which are ejected from said safety plug when said plug blows and a lock for holding said regulator body in said overlying position.

9. A regulator for a pressure cooker comprising a vent, a regulator body pivotally mounted adjacent said vent, said regulator body having an enlarged under surface overlying said vent, a valve mounted on said body and having a spherical seat-closing surface, said vent having a conical valve seat cooperable with said spherical surface, the weight and the distance of the center of gravity of said regulator body from said pivotal connection being proportioned to the distance of said valve from said pivotal connection and to the steam contacting area of said spherical surface to cause said regulator valve to have a regular and continuous reciprocal swinging motion during the time that the pressure is sufficient to cause steam to escape from said vent.

10. A regulator as claimed in claim 9 in which the under surface is of sufficient area to react with steam escaping from the vent to form a sounding board cooperating with the sound of escaping steam to create a continuous flutter-like audible sound.

11. A regulator as claimed in claim 9 in which the regulator body has a recess and the valve has a flange loosely fittable in said recess and in which a member holds the flange in said recess to floatably mount said valve on said body.

WILLARD L. MORRISON, JR.

REFERENCES CITED

The following references are of record in the file of this patent:

UNITED STATES PATENTS

| Number | Name | Date |
| --- | --- | --- |
| D. 146,235 | Russell | Jan. 14, 1947 |
| 1,106,837 | Pfoehler | Aug. 11, 1914 |
| 2,134,759 | Howlett | Nov. 1, 1938 |
| 2,403,778 | Zdanaitis | July 9, 1946 |
| 2,429,149 | Wittenberg | Oct. 14, 1947 |
| 2,436,566 | Goldberg | Feb. 24, 1948 |
| 2,475,397 | Martin | July 5, 1949 |
| 2,483,297 | Naylor | Sept. 27, 1949 |

FOREIGN PATENTS

| Number | Country | Date |
| --- | --- | --- |
| 218,871 | Great Britain | July 17, 1924 |